US008918395B2

(12) United States Patent
Gehrking et al.

(10) Patent No.: US 8,918,395 B2
(45) Date of Patent: Dec. 23, 2014

(54) CATEGORIZING OBJECTS, SUCH AS DOCUMENTS AND/OR CLUSTERS, WITH RESPECT TO A TAXONOMY AND DATA STRUCTURES DERIVED FROM SUCH CATEGORIZATION

(75) Inventors: David Gehrking, Encino, CA (US);
Ching Law, Los Angeles, CA (US);
Andrew Maxwell, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/528,197

(22) Filed: Jun. 20, 2012

(65) Prior Publication Data

US 2012/0259856 A1     Oct. 11, 2012

Related U.S. Application Data

(62) Division of application No. 11/112,716, filed on Apr. 22, 2005, now Pat. No. 8,229,957.

(51) Int. Cl.
*G06F 7/00*     (2006.01)
*G06F 17/30*     (2006.01)

(52) U.S. Cl.
CPC .. *G06F 17/30864* (2013.01); *G06F 14/30707* (2013.01)
USPC ............ 707/737; 707/778; 707/730; 707/740

(58) Field of Classification Search
CPC ............ G06F 17/2785; G06F 17/2795; G06F 17/3071
USPC .................................. 707/730, 738, 739, 737
See application file for complete search history.

(56) References Cited

U.S. PATENT DOCUMENTS

| 5,202,952 | A | * | 4/1993 | Gillick et al. ................. 704/200 |
| 5,675,819 | A | * | 10/1997 | Schuetze ......................... 704/10 |
| 5,724,521 | A | * | 3/1998 | Dedrick ....................... 705/26.1 |
| 5,740,549 | A | * | 4/1998 | Reilly et al. ............... 705/14.42 |
| 5,848,397 | A | * | 12/1998 | Marsh et al. ............... 705/14.61 |
| 5,948,061 | A | * | 9/1999 | Merriman et al. ............ 709/219 |
| 6,026,368 | A | * | 2/2000 | Brown et al. ............. 705/14.56 |
| 6,044,376 | A | * | 3/2000 | Kurtzman, II ........................ 1/1 |
| 6,078,914 | A | * | 6/2000 | Redfern ................................ 1/1 |
| 6,144,944 | A | * | 11/2000 | Kurtzman et al. ......... 705/14.54 |
| 6,167,382 | A | * | 12/2000 | Sparks et al. ............. 705/14.73 |
| 6,269,361 | B1 | * | 7/2001 | Davis et al. .......................... 1/1 |
| 6,401,075 | B1 | * | 6/2002 | Mason et al. ............... 705/14.72 |

(Continued)

OTHER PUBLICATIONS

T. Kohonen T: "Exploration of very large databases by selforganizing maps", *International Conference on Neural Networks*,1997, Houston, TX, USA Jun. 9-12, 1997, New York, NY, USA, IEEE, US, vol. 1, Jun. 9, 1997, pp. PL 1-PL6, XP010238780, 001: 10.11 09I1CNN. 1997.611622, ISBN: 978-0-7803-4122-7.

(Continued)

*Primary Examiner* — Cheyne D Ly
(74) *Attorney, Agent, or Firm* — Foley and Lardner LLP; John D. Lanza

(57) ABSTRACT

A Website may be automatically categorized by (a) accepting Website information, (b) determining a set of scored clusters (e.g., semantic, term co-occurrence, etc.) for the Website using the Website information, and (c) determining at least one category (e.g., a vertical category) of a predefined taxonomy using at least some of the set of clusters.

13 Claims, 17 Drawing Sheets

(56) References Cited

U.S. PATENT DOCUMENTS

| | | | |
|---|---|---|---|
| 6,578,032 B1* | 6/2003 | Chandrasekar et al. | 1/1 |
| 6,704,729 B1* | 3/2004 | Klein et al. | 1/1 |
| 6,751,621 B1* | 6/2004 | Calistri-Yeh et al. | 1/1 |
| 6,985,882 B1* | 1/2006 | Del Sesto | 705/37 |
| 7,039,599 B2* | 5/2006 | Merriman et al. | 705/14.52 |
| 7,136,875 B2* | 11/2006 | Anderson et al. | 1/1 |
| 2001/0021931 A1* | 9/2001 | Vaughan | 707/100 |
| 2002/0152222 A1* | 10/2002 | Holbrook | 707/104.1 |
| 2002/0165873 A1* | 11/2002 | Kwok et al. | 707/500 |
| 2003/0217335 A1* | 11/2003 | Chung et al. | 715/514 |
| 2004/0068697 A1* | 4/2004 | Harik et al. | 715/513 |
| 2004/0093321 A1* | 5/2004 | Roustant et al. | 707/3 |
| 2005/0055271 A1* | 3/2005 | Axe et al. | 705/14 |
| 2005/0055341 A1* | 3/2005 | Haahr et al. | 707/3 |
| 2005/0120006 A1* | 6/2005 | Nye | 707/3 |
| 2006/0136451 A1* | 6/2006 | Denissov | 707/101 |

OTHER PUBLICATIONS

Ko-Kang C Hu et al: "Measuring website popularity and raising designers' effort", *IEEE International Conference on Systems, Man and Cybernetics*, 2004, IEEE, Piscataway, NJ, USA, vol. 5, Oct. 10, 2004, pp. 4095-4099. XP010772969, ISBN: 978-0-7803-8566-5.

Communication pursuant to Article 94(3) EPC for EP Patent Application Serial No. 06 769 880,3-1952, mailed on Mar. 25, 2013 (9 pgs.).

Examiner's Report for Canadian Patent Application No. 2,605,747, mailed May 30, 2013 (4 pgs.).

* cited by examiner

FIGURE 20

ICCS: INTRA-CATEGORY CLUSTER SCORE
S&SCCS: SELF&SUBSUMED CATEGORY CLUSTER SCORE

CATEGORIZING OBJECTS, SUCH AS DOCUMENTS AND/OR CLUSTERS, WITH RESPECT TO A TAXONOMY AND DATA STRUCTURES DERIVED FROM SUCH CATEGORIZATION

§0. CROSS-REFERENCE TO RELATED APPLICATIONS

This application is a divisional of U.S. patent application Ser. No. 11/112,716 (referred to as "the '716 application" and incorporated herein by reference), filed on Apr. 22, 2005 now U.S. Pat. No. 8,229,957, titled "CATEGORIZING OBJECTS, SUCH AS DOCUMENTS AND/OR CLUSTERS, WITH RESPECT TO A TAXONOMY AND DATA STRUCTURES DERIVED FROM SUCH CATEGORIZATION," and listing David GEHRKING, Ching LAW and Andrew MAXWELL, as the inventors.

§1. BACKGROUND OF THE INVENTION

§1.1 Field of the Invention

The present invention concerns organizing information. In particular, the present invention concerns categorizing terms, phrases, documents and/or term co-occurrence clusters with respect to a taxonomy and using such categorized documents and/or clusters.

§1.2 Background Information

A "taxonomy" is a structured, usually hierarchical, set of categories or classes (or the principles underlying the categorization or classification). Taxonomies are useful because they can be used to express relationships between various things (referred to simply as "objects"). For example, taxonomies can be used to determine whether different objects "belong" together or to determine how closely different objects are related.

Unfortunately, assigning objects to the appropriate category or categories of a taxonomy can be difficult. This is particularly true if different types of objects are to be assigned to the taxonomy. Also, this is particularly true if attributes of the objects, used for categorization, can change over time, or if many objects are being added and/or removed from a universe of objects to be categorized. For example, Websites are continuously being added and removed from the World Wide Web. Further, the content of Websites often changes. Thus, categorizing Websites can be challenging.

In view of the foregoing, it would be useful to provide automated means for assigning objects (e.g., Websites), and possibly different types of objects, to appropriate categories of a taxonomy.

§2. SUMMARY OF THE INVENTION

At least some embodiments consistent with the present invention may automatically categorize a Website. Such embodiments may do so by (a) accepting Website information, (b) determining a set of scored clusters (e.g., semantic, term co-occurrence, etc.) for the Website using the Website information, and (c) determining at least one category (e.g., a vertical category) of a predefined taxonomy using at least some of the set of clusters.

At least some embodiments consistent with the present invention may associate a semantic cluster (e.g., a term co-occurrence cluster) with one or more categories (e.g., vertical categories) of a predefined taxonomy. Such embodiments may do so by (a) accepting a semantic cluster, (b) identifying a set of a one or more scored concepts using the accepted cluster, (c) identifying a set of one or more categories using at least some of the one or more scored concepts, and (d) associating at least some of the one or more categories with the semantic cluster.

At least some embodiments consistent with the present invention may associate a property (e.g., a Website) with one or more categories (e.g., vertical categories) of a predefined taxonomy. Such embodiments may do so by (a) accepting information about the property, (b) identifying a set of a one or more scored semantic clusters (e.g., term co-occurrence clusters) using the accepted property information, (c) identifying a set of one or more categories (e.g., vertical categories) using at least some of the one or more scored semantic clusters, and (d) associating at least some of the one or more categories with the property.

§3. BRIEF DESCRIPTION OF THE DRAWINGS

FIGS. 18-23 illustrate various display screens of an exemplary user interface consistent with the present invention.

§4. DETAILED DESCRIPTION

Figure 1:
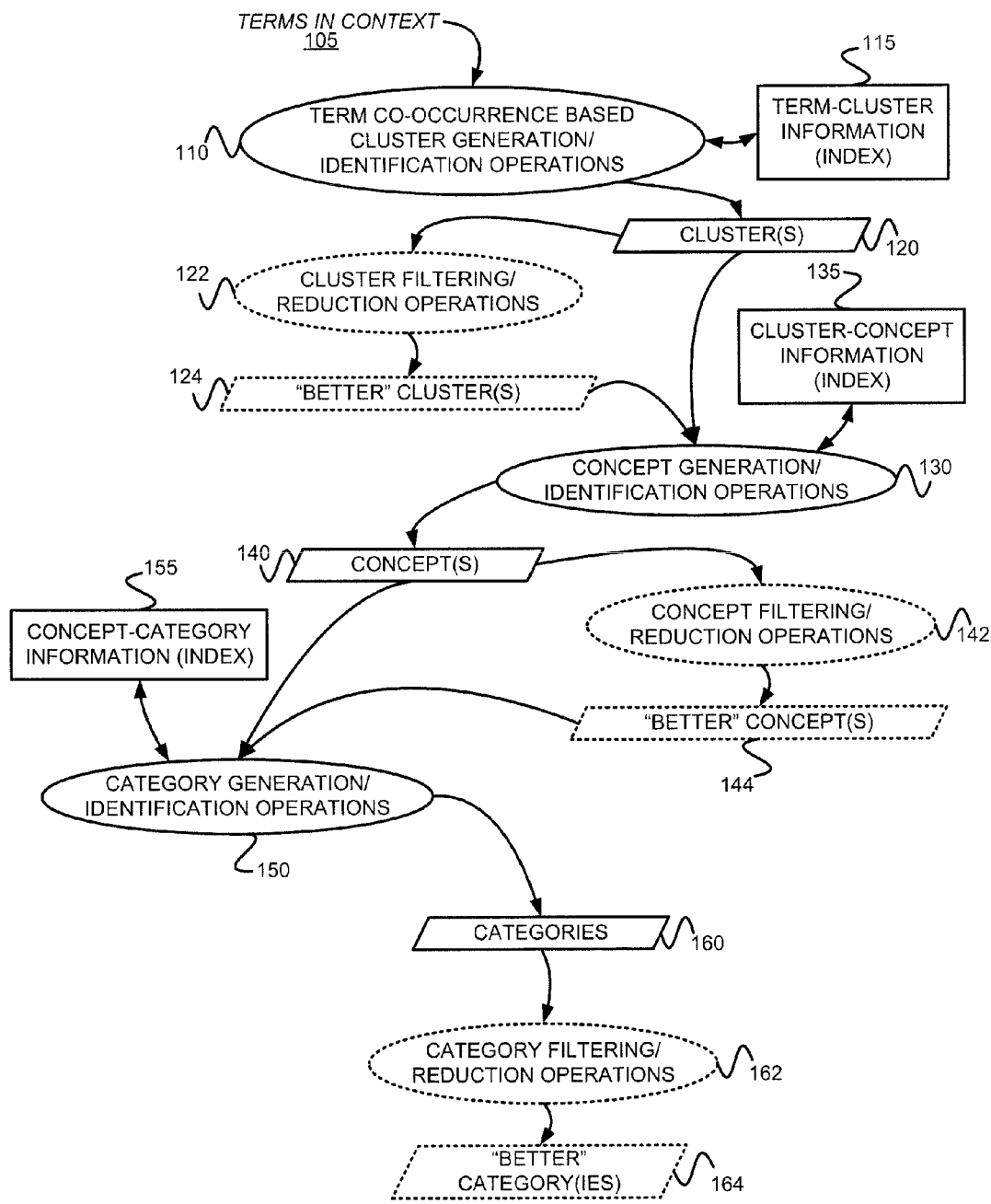
FIG. 1 illustrates operations that may be provided in exemplary embodiments consistent with the present invention, as well as information that may be used and/or generated by such operations.

The present invention may involve novel methods, apparatus, message formats for categorizing objects, such as words, phrases, documents, and/or clusters for example, with respect to a taxonomy and data structures derived from such categorization. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

In the following, definitions that may be used in the specification are provided in §4.1. Then, exemplary embodiments consistent with the present invention are described in §4.2. An example illustrating operations in an exemplary embodiment consistent with the present invention is provided in §4.3. Finally, some conclusions regarding the present invention are set forth in §4.4.

§4.1 Definitions

A "property" is something on which ads can be presented. A property may include online content (e.g., a Website, an MP3 audio program, online games, etc.), offline content (e.g., a newspaper, a magazine, a theatrical production, a concert, a sports event, etc.), and/or offline objects (e.g., a billboard, a stadium score board, and outfield wall, the side of truck trailer, etc.). Properties with content (e.g., magazines, newspapers, Websites, email messages, etc.) may be referred to as "media properties." Although properties may themselves be offline, pertinent information about a property (e.g., attribute(s), topic(s), concept(s), category(ies), keyword(s), relevancy information, type(s) of ads supported, etc.) may be available online. For example, an outdoor jazz music festival may have entered the topics "music" and "jazz", the location of the concerts, the time of the concerts, artists scheduled to appear at the festival, and types of available ad spots (e.g., spots in a printed program, spots on a stage, spots on seat backs, audio announcements of sponsors, etc.).

A "document" is to be broadly interpreted to include any machine-readable and machine-storable work product. A document may be a file, a combination of files, one or more files with embedded links to other files, etc. The files may be of any type, such as text, HTML, XML, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has a unique, addressable, storage location and can therefore be uniquely identified by this addressable location. A universal resource locator (URL) is a unique address used to access information on the Internet. Another example of a document is a Website including a number of related (e.g., linked) Web pages. Yet another example of a document is an advertisement.

A "Web document" includes any document published on the Web. Examples of Web documents include, for example, a Website or a Web page.

"Document information" may include any information included in the document, information derivable from information included in the document (referred to as "document derived information"), and/or information related to the document (referred to as "document related information"), as well as extensions of such information (e.g., information derived from related information). An example of document derived information is a classification based on textual content of a document. Examples of document related information include document information from other documents with links to the instant document, as well as document information from other documents to which the instant document links.

"Verticals" are groups of related products, services, industries, content formats, audience demographics, and/or topics that are likely to be found in, or for, Website content.

A "cluster" is a group of elements that tend to occur closely together. For example, a cluster may be a set of terms that tend to co-occur often (e.g., on Web pages, in search queries, in product catalogs, in articles (online or offline) in speech, in discussion or e-mail threads, etc.).

A "concept" is a bearer of meaning (as opposed to an agent of meaning, such as a particular word in a particular language). Thus, for example, a single concept can be expressed by any number of languages, or in alternative ways in a given language. For example, the words STOP, HALT, ANSCHLAG, ARRESTO and PARADA all belong to the same concept. Concepts are abstract in that they omit the differences of the things in their extension, treating them as if they were identical. Concepts are universal in that they apply equally to everything in their extension.

A "taxonomy" is a structured, usually hierarchical (but may be flat), set of categories or classes (or the principles underlying the categorization or classification). A "category" may correspond to a "node" of the taxonomy.

A "score" can be any numerical value assigned to an object. Thus, a score can include a number determined by a formula, which may be referred to as a "formulaic score". A score can include a ranking of an object in an ordered set of objects, which may be referred to as an "ordinal score".

§4.2 Exemplary Embodiments Consistent with the Present Invention

FIG. 1 illustrates operations that may be provided in exemplary embodiments consistent with the present invention, as well as information that may be used and/or generated by such operations. Term co-occurrence based cluster generation/identification operations 110 may accept terms in context 105 and generate term-cluster information (e.g., an index) 115. Once such information 115 has been generated, the term co-occurrence generation/identification operations 110 can be used to identify one or more clusters (e.g., of terms) 120 in response to input term(s) 105. Filtering/data reduction operations 122 may be used to generate a subset of "better" clusters 122.

Concept generation/identification operations 130 may accept clusters 120 or 124 and generate cluster-concept information (e.g., an index) 135. Once such information 135 has been generated, the concept generation/identification operations 130 can be used to identify one or more concepts 140 in response to input clusters 120 or 124. Filtering/data reduction operations 142 may be used to generate a subset of "better" concepts 144.

Category generation/identification operations 150 may accept concepts 140 or 144 and generate concept-category information (e.g., an index) 155. Once such information 155 has been generated, the category generation/identification operations 150 can be used to identify one or more categories 160 in response to input concepts 140 or 144. These categories may be nodes of a taxonomy. Category filtering/reduction operations 162 may be used to generate a subset of "better" categories 164.

There are many examples of terms in context 105. For example, terms in context may be words and/or phrases included in a search query, and/or of a search session including one or more search queries. As another example, terms in context may be words and/or phrases found in a document (e.g., a Web page) or a collection or group of documents (e.g., a Website). As yet another example, terms in context may be words and/or phrases in the creative of an advertisement.

Referring back to term co-occurrence based cluster generation/identification operations 110, co-occurrence of terms in some context or contexts (e.g., search queries, search sessions, Web pages, Websites, articles, blogs, discussion threads, etc.) may be used to generate groups or clusters of words. Once these clusters are defined, a word-to-cluster index may be stored. Using such an index, given a word or words, one or more clusters which include the words can be identified. An example of operations used to generate and/or identify such clusters is a probabilistic hierarchical inferential learner (referred to as "PHIL"), such as described in U.S. Provisional Application Ser. No. 60/416,144 (referred to as "the '144 provisional" and incorporated herein by reference), titled "Methods and Apparatus for Probabilistic Hierarchical Inferential Learner," filed on Oct. 3, 2002, and U.S. patent application Ser. No. 10/676,571 (referred to as "the '571 application" and incorporated herein by reference), titled "Methods and Apparatus for Characterizing Documents Based on Cluster Related Words," filed on Sep. 30, 2003 and listing Georges Harik and Noam Shazeer as inventors.

One exemplary embodiment of PHIL is a system of interrelated clusters of terms that tend to occur together in www-.google.com search sessions. A term within such a cluster may be weighted by how statistically important it is to the cluster. Such clusters can have from a few terms, to thousands of terms. One embodiment of the PHIL model contains hundreds of thousands of clusters and covers all languages in proportion to their search frequency. Clusters may be assigned attributes, such as STOP (e.g., containing mostly words such as "the," "a," "an," etc, that convey little meaning), PORN, NEGATIVE (containing words that often appear in negative, depressing, or sensitive articles such as "bomb," "suicide," etc.), and LOCATION, etc., to be used by applications (e.g., online ad serving systems). In another embodiment of PHIL, a model is maintained for each language which simplifies maintenance and updating.

A PHIL server can take a document (e.g., a Webpage) as an input and return clusters that "match" the content. It can also take an ad creative and/or targeting keywords as input and return matching clusters. Thus, it can be used to match ads to the content of Webpages.

Referring back to concept generation/identification operations 130 and the category generation/identification operations 150, these operations can accept one or more clusters and identify one or more categories (e.g., nodes) of a taxonomy. When used in concert with term co-occurrence cluster identification operations 110, these operations 130 and 150 can accept one or more terms and identify one or more categories of a taxonomy.

An example of operations 130 and 150 used to generate and/or identify categories is a semantic recognition engine, such as described in U.S. Pat. No. 6,453,315 (incorporated herein by reference), titled "Meaning-Based Information Organization and Retrieval" and listing Adam Weissman and Gilad Isreal Elbaz as inventors; and U.S. Pat. No. 6,816,857 (incorporated herein by reference), titled "Meaning-Based Advertising and Document Relevant Determination" and listing Adam Weissman and Gilad Israel Elbaz as inventors;

An exemplary semantic recognition engine (referred to as "Circadia" below) can examine a document and categorize it into any taxonomy. Circadia includes a proprietary ontology of hundreds of thousands of interrelated concepts and corresponding terms. The concepts in the Circadia ontology are language-independent. Terms, which are language-specific, are related to these concepts. A Circadia server supports two major operations—"sensing" and "seeking." The sensing operation accepts, as input, a document or a string of text and returns, as output, a weighted set of concepts (referred to as a "gist") for the input. Thus, the sensing operation in Circadia is an example of concept identification operations 130. This gist can then be used as a seek request input. In response, the best categories and their respective semantic scores in the specified taxonomy are returned. Thus, the seeking operation in Circadia is an example of category identification operations 150 (and perhaps category filtering/reduction operations 162). Naturally, other taxonomies such as the Open Directory Project ("ODP") taxonomy, the Standard Industrial Classification ("SIC") taxonomy, etc., may be used.

Figure 2:
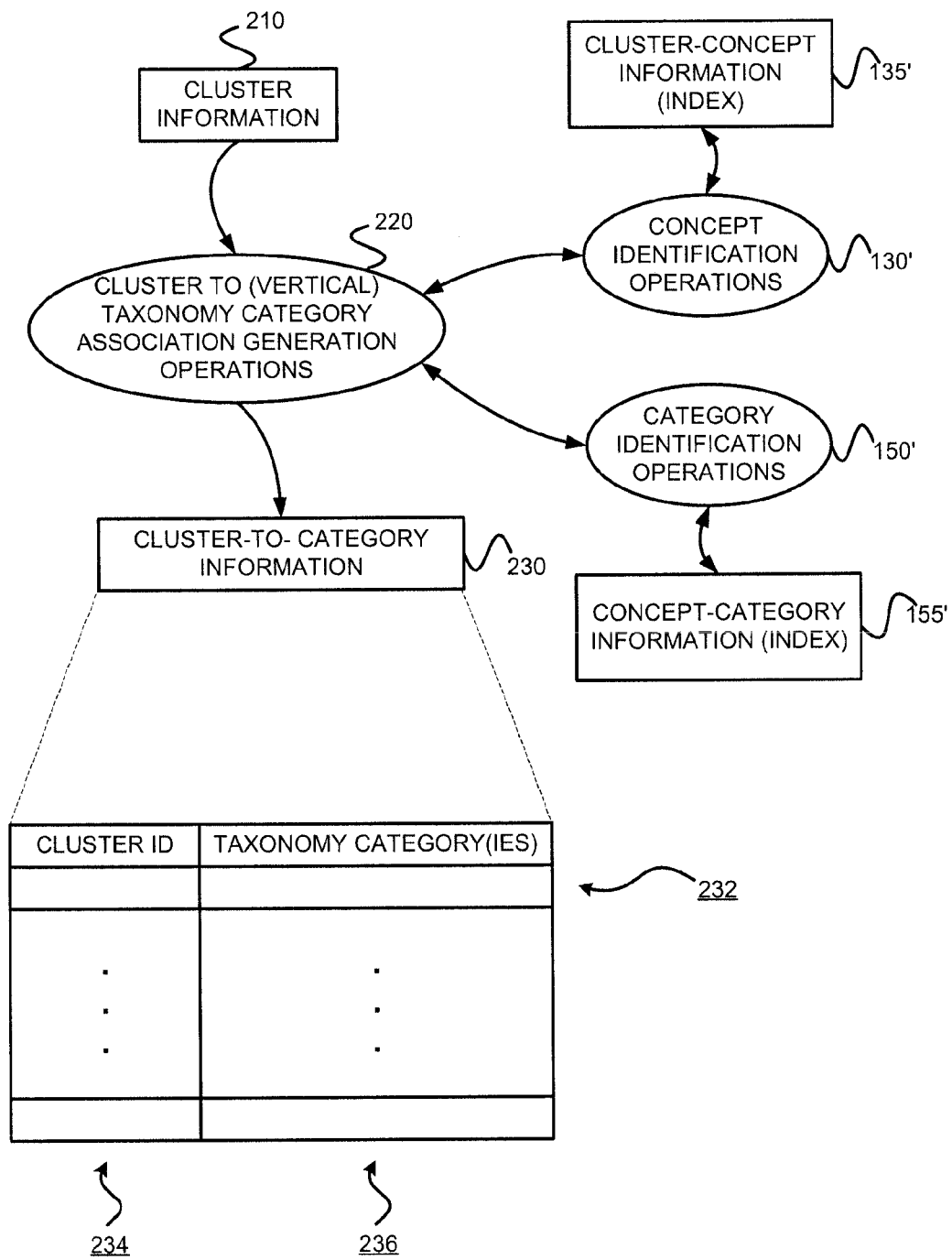
FIG. 2 illustrates operations that may be provided in exemplary embodiments consistent with the present invention, as well as information that may be used and/or generated by such operations, for associating (e.g., mapping or indexing) clusters (e.g., sets of words and/or terms) with categories of a taxonomy.

FIG. 2 illustrates operations that may be provided in exemplary embodiments consistent with the present invention, as well as information that may be used and/or generated by such operations, for associating (e.g., mapping or indexing) clusters (e.g., sets of words and/or terms) with categories of a taxonomy. Cluster to taxonomy category association generation operations 220 accept cluster information 210 and generate cluster-to-category information 230. For example, operations 220 may pass cluster information (e.g., cluster identifiers) to concept identification operations 130', which may use cluster-concept information (e.g., an index) 135' to get one or more concepts. Such operations 130' may then return the concept(s) to the cluster to taxonomy category association generation operations 220. These operations 220 may then pass concept information (e.g., concept identifiers) to category identification operations 150', which may use concept-category information (e.g., an index) 155' to get one or more categories. Such operations 150' may then return the category(ies) to the cluster to taxonomy category association generation operations 220. Using the accepted cluster information 210 and the returned category information, the operations 220 may then generate cluster-to-category association information (e.g., a mapping or index) 230.

As shown, in at least one embodiment consistent with the present invention, the information 230 may be a table including a plurality of entries 232. Each of the entries 232 may include a cluster identifier 234 and (an identifier for each of) one or more categories of a taxonomy 236. Although not shown, an inverted index, mapping each category to one or more clusters, may also be generated and stored.

Figure 3:
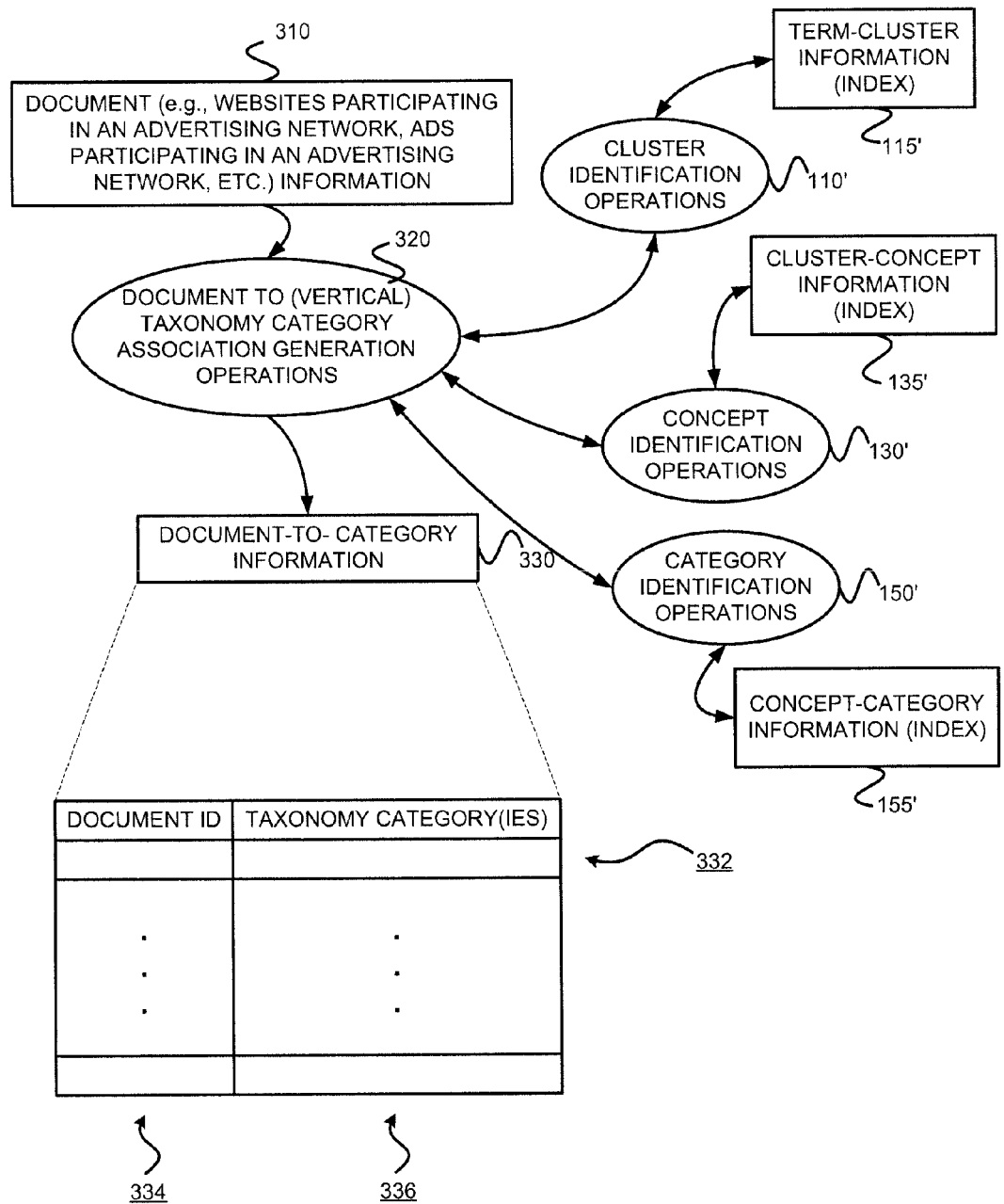
FIG. 3 illustrates operations that may be provided in exemplary embodiments consistent with the present invention, as well as information that may be used and/or generated by such operations, for associating documents with categories of a taxonomy.

FIG. 3 illustrates operations that may be provided in exemplary embodiments consistent with the present invention, as well as information that may be used and/or generated by such operations, for associating (e.g., mapping or indexing) document (e.g., Webpages, Websites, advertisement creatives) information with categories of a taxonomy. Document to taxonomy category association generation operations 320 accept document information 320 and generate document-to-category information 330. For example, operations 320 may pass document information to cluster identification operations 110', which may use term to cluster information (e.g., an index) 115' to identify one or more clusters. Such operations 110' may then return the cluster(s) to the document to taxonomy category association generation operations 320. These operations 320 may then pass cluster information (e.g., cluster identifiers) to concept identification operations 130', which may use cluster-concept information (e.g., an index) 135' to get one or more concepts. Such operations 130' may then return the concept(s) to the document to taxonomy category association generation operations 320. These operations 320 may then pass concept information (e.g., concept identifiers) to category identification operations 150', which may use concept-category information (e.g., an index) 155' to get one or more categories. Such operations 150' may then return the category(ies) to the document to taxonomy category association generation operations 320. Using the accepted document information 310 and the returned category information, the operations 320 may then generate document-to-category association information (e.g., a mapping or index) 330.

As shown, in at least one embodiment consistent with the present invention, the information 330 may be a table including a plurality of entries 332. Each of the entries 332 may include a document identifier 334 and (an identifier for each of) one or more categories of a taxonomy 336. Although not shown, an inverted index, mapping each category to one or more documents, may also be generated and stored.

Figure 4:
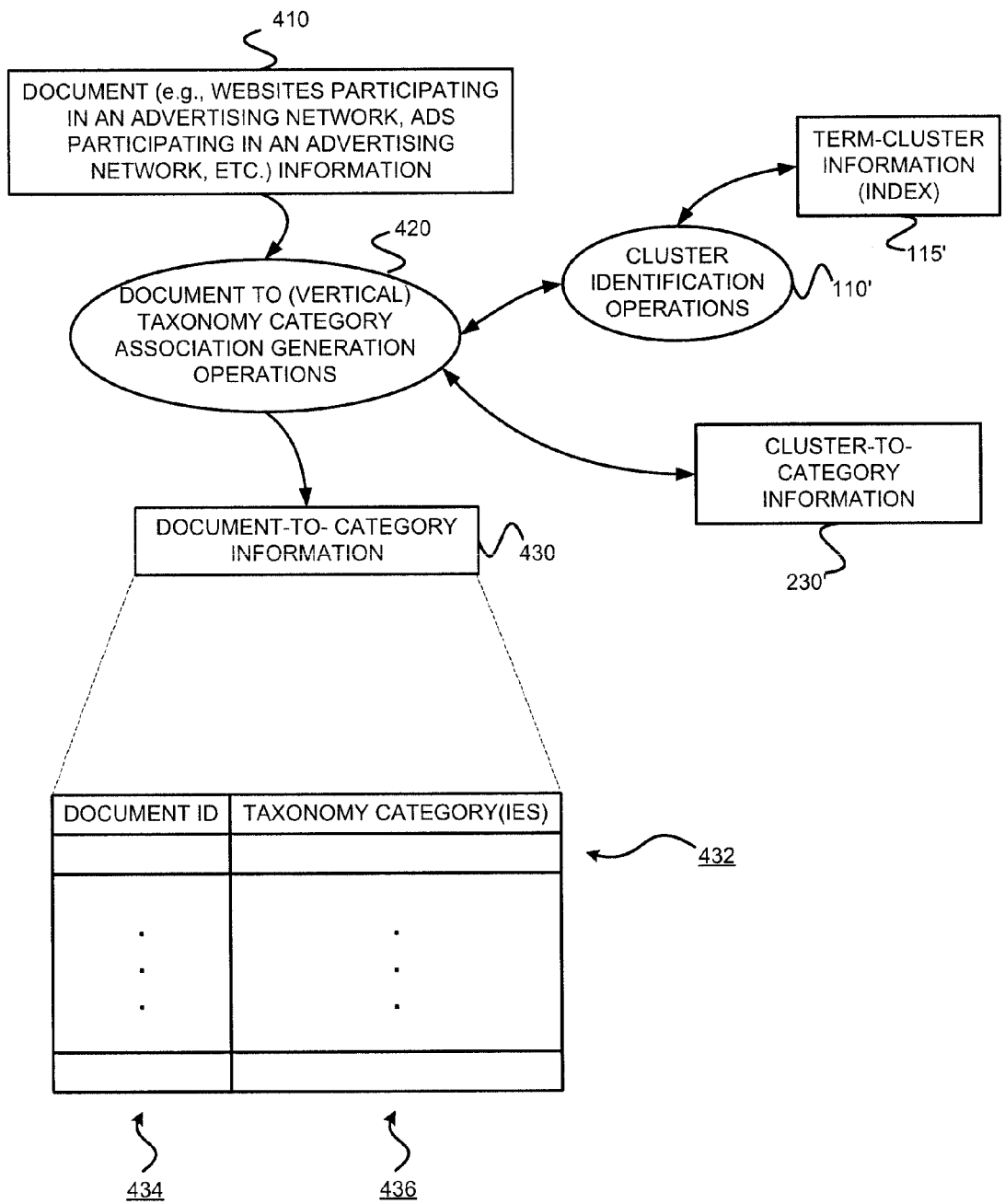
FIG. 4 illustrates operations that may be provided in exemplary embodiments consistent with the present invention, as well as information that may be used and/or generated by such operations, for associating documents with categories of a taxonomy.

FIG. 4 illustrates alternative operations that may be provided in exemplary embodiments consistent with the present invention, as well as information that may be used and/or generated by such operations, for associating (e.g., mapping or indexing) documents (e.g., Webpages, Websites, advertisement creatives) with categories of a taxonomy. Document to taxonomy category association generation operations 420 accept document information 420 and generate document-to-category information 430. For example, operations 420 may pass document information to cluster identification operations 110', which may use term to cluster information (e.g., an index) 115' to identify one or more clusters. Such operations 110' may then return the cluster(s) to the document to taxonomy category association generation operations 420. These operations 420 may then use the cluster information (e.g., cluster identifiers) to find one or more associated categories using cluster-to-category information 230'. This information 230' may be the mapping shown in FIG. 2 for example. More specifically, each cluster identifier may be used to lookup one or more associated categories (Recall, e.g., 234 and 236 of FIG. 2.). Using the accepted document information 410 and the category information, the operations 420 may then generate document-to-category association information (e.g., a mapping or index) 430.

As shown, as was the case with the exemplary embodiment of FIG. 3, in at least one embodiment consistent with the present invention the information 430 may be a table including a plurality of entries 432. Each of the entries 432 may include a document identifier 434 and (an identifier for each of) one or more categories of a taxonomy 436. Although not shown, an inverted index, mapping each category to one or more documents, may also be generated and stored.

§4.2.1 Exemplary Methods

Figure 5:
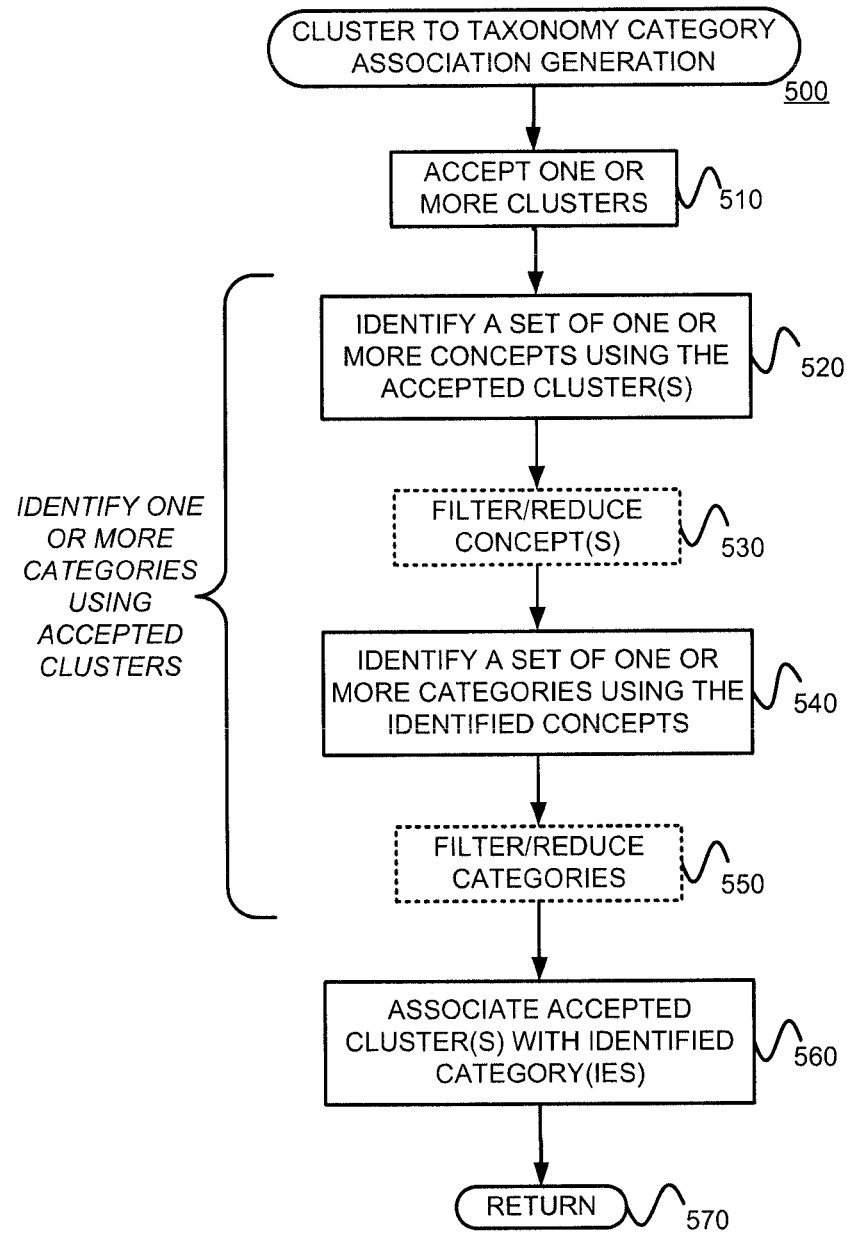
FIG. 5 is a flow diagram of an exemplary method 500 that may be used to associate one or more clusters with one or more taxonomy categories, in a manner consistent with the present invention.

FIG. 5 is a flow diagram of an exemplary method 500 that may be used to associate one or more clusters with one or more categories, in a manner consistent with the present invention. Referring back to FIG. 2, the method 500 may be used to perform operations 220. The main acts of method 500 may be performed for each of a plurality of clusters. Alternatively, clusters could be grouped, and processed and treated as a group. To simplify the description of the method 500, however, the processing of a single cluster will be described. A cluster is accepted (Block 510) and a set of one or more concepts is identified using the cluster (Block 520). The identified concept(s) may be reduced and/or filtered. (Block 530) Then, a set of one or more categories may be identified using the identified concepts. (Block 540) The identified category (ies) may be reduced and/or filtered. (Block 550) Finally, the accepted cluster may be associated with the identified (and perhaps filtered) category(ies) (Block 560) before the method 500 is left (Node 570).

Referring back to block 510, the cluster may be a PHIL cluster, or a set of terms tending to co-occur in search queries or search sessions for example. The cluster may be a set of terms that tend to co-occur in documents.

Referring back to block 530, concepts may be filtered and/or reduced by, for example, scoring them, applying the concept scores to one or more thresholds (absolute and/or relative), taking only the top N scoring concepts, or any combination of the foregoing. Similarly, referring back to block 550, categories may be filtered and/or reduced by, for example, scoring them, applying the category scores to one or more thresholds (absolute and/or relative), taking only the top M scoring concepts, or any combination of the foregoing.

As indicated by the bracket, acts 520-550 may be combined into a single act of identifying one or more categories using the accepted cluster. However, Circadia is designed to categorize using a "sense" operation followed by a "seek" operation. One advantage of first identifying concepts from clusters, and then identifying categories from the concepts, rather than just going directly from clusters to categories, is that if intermediate concepts ("gists") are stored, they can be used directly to classify into any of a number of the available taxonomies without needing to repeat the sense operation. That is, once a concept has been determined, it is easy to get to terms, categories, other concepts, etc.

Referring back to block 560, a cluster may be associated with one or more categories by generating and storing an index which maps a cluster (identifier) to one or more categories (identifiers). Alternatively, or in addition, an inverted index, which maps a category (identifier) to one or more clusters (identifiers) may be generated and stored.

Referring back to block 510, a cluster may be refined to include only the top T (e.g., 50) terms (e.g., based on inter-cluster scoring, and/or intra-cluster scoring). Here, intra-cluster scoring may increase as the number of times the term appears in the cluster increases and may decrease as the number of times the term appears in a document (e.g., Webpages, search queries, search sessions) collection increases. Thus, the intra-cluster score may be defined as, for example, count_in_cluster/count_in_search_query_collection. In addition, the number (T) of top terms for each cluster may be determined based on an intra-cluster firing rather than the same fixed number of terms for each cluster. Cluster scorings used in the '571 application may also be used.

Referring back to blocks 520-550 of FIG. 5, in at least one exemplary embodiment consistent with the present invention, concepts can be determined from clusters using a Circadia server as follows.

Referring back to block 520 of FIG. 5, the first step in categorization using Circadia is to do a "sense" operation, which returns a "gist." The gist is the internal weighted set of concept matches from the Circadia ontology. Thus, a gist (e.g., based on the 50 terms) for each cluster is obtained.

Referring back to blocks 540 and 550 of FIG. 5, the second step involves doing a "seek" operation to request the top N (e.g., N=2) categories and corresponding semantic scores from a specified taxonomy, given a gist.

In at least one exemplary embodiment consistent with the present invention, the top two categories and their corresponding semantic scores are requested from the seek operation. In such an exemplary embodiment(s), these top two categories are referred to as the "primary" category (for the top scoring one) and "secondary" category for each cluster. If Circadia doesn't determine any category for a cluster, the cluster receives primary and secondary categories of "NONE". If Circadia only determines a primary category, but not a secondary category, the secondary category is set to "NONE".

Referring back to block 550, at least one embodiment consistent with the present invention filters out categories with scores that are less than a threshold. The threshold may be a predetermined threshold. Further, the threshold may be set lower if there are more terms in the original cluster which, in effect, considers the number of terms in each cluster as a kind of measurement of statistical significance for the Circadia call. For example, if a cluster has more than M (e.g., 50) terms, then one can be more confident that using just the top 50 of them would provide a good representative sample, which allows the threshold to be relaxed. If, however, a cluster has fewer than M terms, it may be advisable to raise the threshold because the sample of terms is smaller and may include less meaningful terms of the cluster.

Figure 6:
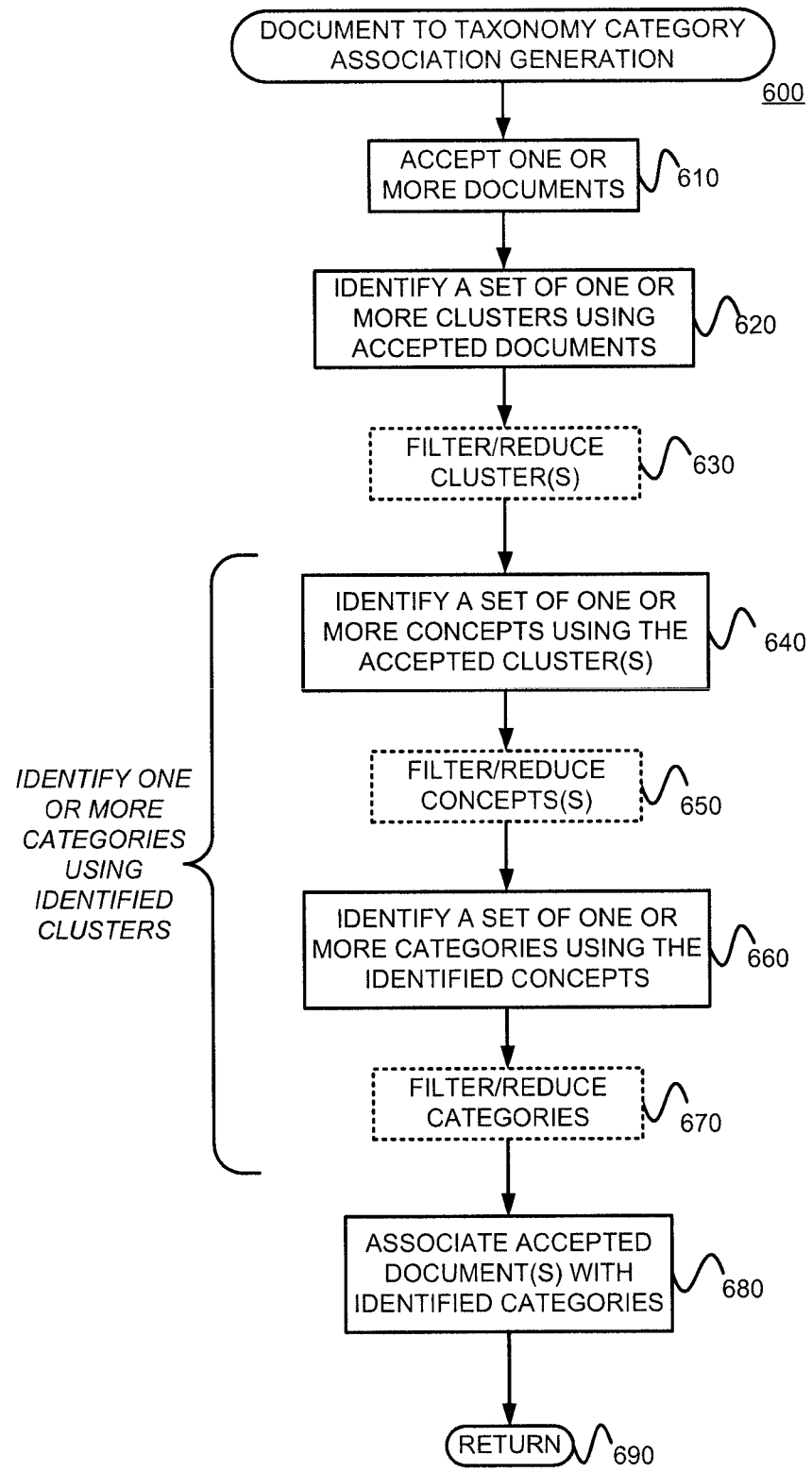
FIG. 6 is a flow diagram of an exemplary method 600 that may be used to associate one or more documents with one or more taxonomy categories, in a manner consistent with the present invention.

FIG. 6 is a flow diagram of an exemplary method 600 that may be used to associate one or more documents with one or more categories, in a manner consistent with the present invention. Referring back to FIG. 3, the method 600 may be used to perform operations 320. The main acts of method 600 may be performed for each of a plurality of documents. Alternatively, documents could be grouped and processed and treated as a group. To simplify the description of the method 600, however, the processing of a single document will be described. A document is accepted (Block 610) and a set of one or more clusters is identified using (e.g., terms of) the accepted document (Block 620). The cluster(s) may then be filtered and/or reduced. (Block 630) A set of one or more concepts is then identified using the clusters (Block 640). The identified concept(s) may be reduced and/or filtered. (Block 650) Then, a set of one or more categories may be identified using the identified concepts. (Block 660) The identified category(ies) may be reduced and/or filtered. (Block 670) Finally, the accepted document may be associated with the identified category(ies) (Block 680) before the method 600 is left (Node 690).

Referring back to block 610, the document may be a Webpage, content extracted from a Webpage, a portion of a Webpage (e.g., anchor text of a reference or link), a Website, a portion of a Website, creative text of an ad, etc.

Referring back to block 630, clusters may be filtered and/or reduced by, for example, scoring them, applying the cluster scores to one or more thresholds (absolute and/or relative), taking only the top N scoring clusters, or any combination of the foregoing. Similarly, referring back to block 650, concepts may be filtered and/or reduced by, for example, scoring them, applying the concept scores to one or more thresholds (absolute and/or relative), taking only the top N scoring concepts, or any combination of the foregoing. Similarly, referring back to block 670, categories may be filtered and/or reduced by, for example, scoring them, applying the category scores to one or more thresholds (absolute and/or relative), taking only the top M scoring concepts, or any combination of the foregoing.

As indicated by the bracket, though it may be useful to determine intermediate concepts (e.g., "gists") for the reasons introduced above, acts 640-670 may be combined into a single act of identifying one or more categories using the identified cluster(s).

Referring back to block 680, a document may be associated with one or more categories by generating and storing an index which maps a document (identifier) to one or more categories (identifiers). Alternatively, or in addition, an inverted index, which maps a category (identifier) to one or more documents (identifiers) may be generated and stored.

Figure 7:
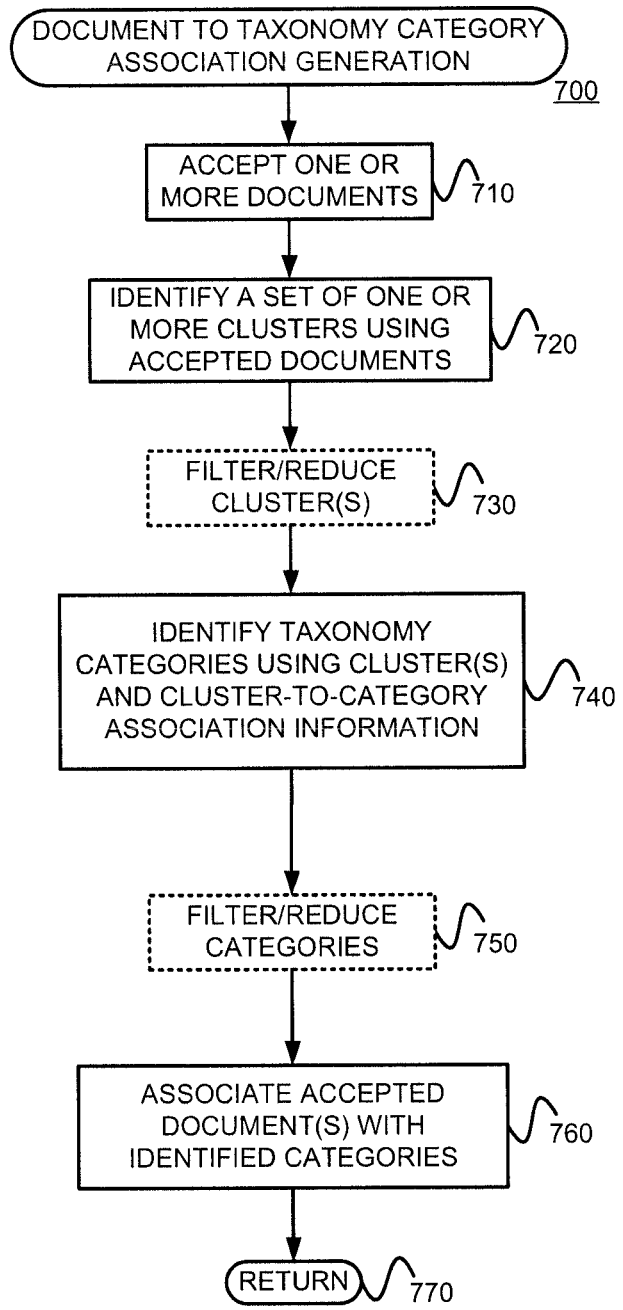
FIG. 7 is a flow diagram of an exemplary method 700 that may be used to associate one or more documents with one or more taxonomy categories, in a manner consistent with the present invention.

FIG. 7 is a flow diagram of an exemplary method 700 that may be used to associate one or more documents with one or more categories, in a manner consistent with the present invention. Referring back to FIG. 4, the method 700 may be used to perform operations 420. The main acts of method 700 may be performed for each of a plurality of documents. Alternatively, documents could be grouped and processed and treated as a group. To simplify the description of the method 700, however, the processing of a single document will be described. A document is accepted (Block 710) and a set of one or more clusters is identified using (e.g., terms of) the accepted document (Block 720). The cluster(s) may then be filtered and/or reduced. (Block 730) A set of one or more categories may be identified using the identified clusters and cluster-to-category association information. (Block 740) The identified categories may be filtered and/or reduced. (Block 750) Finally, the accepted document may be associated with the identified category(ies) (Block 760) before the method 700 is left (Node 770).

Referring back to block 710, the document may be a Webpage, content extracted from a Webpage, a portion of a Webpage (e.g., anchor text of a reference or link), a Website, a portion of a Website, creative text of an ad, etc.

Referring back to block 730, clusters may be filtered and/or reduced by, for example, scoring them, applying the cluster scores to one or more thresholds (absolute and/or relative), taking only the top N scoring clusters, or any combination of the foregoing. Similarly, referring back to block 750, categories may be filtered and/or reduced by, for example, scoring them, applying the category scores to one or more thresholds (absolute and/or relative), taking only the top M scoring concepts, or any combination of the foregoing.

Referring back to block 740, the cluster-to-category association information may be an index that maps each of a number of clusters to one or more categories. (Recall, e.g., 230 of FIGS. 2 and 560 of FIG. 5.)

Referring back to block 760, a document may be associated with one or more categories by generating and storing an index which maps a document (identifier) to one or more categories (identifiers). Alternatively, or in addition, an inverted index, which maps a category (identifier) to one or more documents (identifiers) may be generated and stored.

§4.2.2 Exemplary Apparatus

Figure 25:
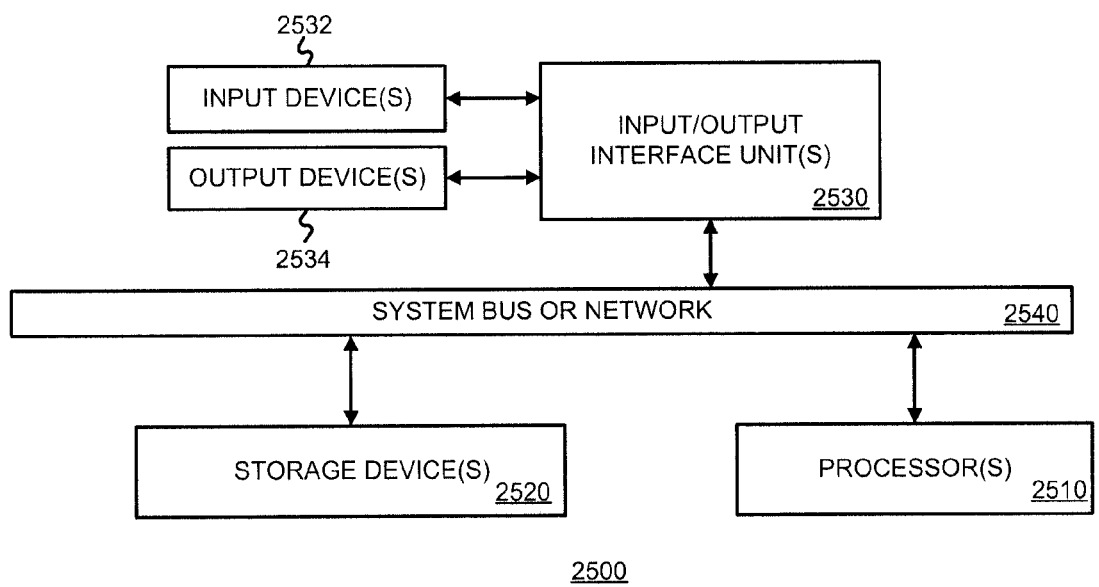
FIG. 25 is a block diagram of exemplary apparatus that may be used to perform operations and/or store information in exemplary embodiments consistent with the present invention.

FIG. 25 is a block diagram of a machine 2500 that may perform one or more of the operations discussed above. The machine 2500 includes one or more processors 2510, one or more input/output interface units 2530, one or more storage devices 2520, and one or more system buses and/or networks 2540 for facilitating the communication of information among the coupled elements. One or more input devices 2532 and one or more output devices 2534 may be coupled with the one or more input/output interfaces 2530.

The one or more processors 2510 may execute machine-executable instructions (e.g., C or C++ running on the Solaris operating system available from Sun Microsystems Inc. of Palo Alto, Calif., the Linux operating system widely available from a number of vendors such as Red Hat, Inc. of Durham, N.C., Java, assembly, Perl, etc.) to effect one or more aspects of the present invention. At least a portion of the machine executable instructions may be stored (temporarily or more permanently) on the one or more storage devices 2520 and/or may be received from an external source via one or more input interface units 2530.

In one embodiment, the machine 2500 may be one or more conventional personal computers, mobile telephones, PDAs, etc. In the case of a conventional personal computer, the processing units 2510 may be one or more microprocessors. The bus 2540 may include a system bus. The storage devices 2520 may include system memory, such as read only memory (ROM) and/or random access memory (RAM). The storage devices 2520 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media, etc.

A user may enter commands and information into the personal computer through input devices 2532, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 2510 through an appropriate interface 2530 coupled to the system bus 2540. The output devices 2534 may include a monitor or other type of display device, which may also be connected to the system bus 2540 via an appropriate interface. In addition to (or instead of) the monitor, the personal computer may include other (peripheral) output devices (not shown), such as speakers and printers for example.

Naturally, many of the about described input and output means might not be necessary in the context of at least some aspects of embodiments consistent with the present invention.

The various operations described above may be performed by one or more machines 2500, and the various information described above may be stored on one or more machines 2500. Such machines 2500 may be connected with one or more networks, such as the Internet for example.

§4.2.3 Refinements and Alternatives

Although many of the embodiments are described in the context of online properties, such as documents and in particular Websites and Webpages, at least some embodiments consistent with the present invention can support offline properties, even including non-media properties.

§4.2.3.1 Exemplary Index Data Structures

Figure 8:
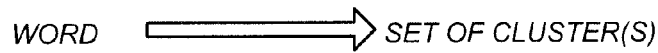
FIGS. 8-17 illustrate various exemplary mappings that can be stored as indexes consistent with the present invention.
Figure 9:
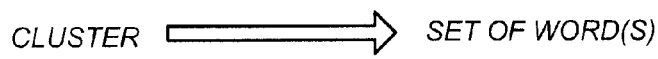
Figure 10:
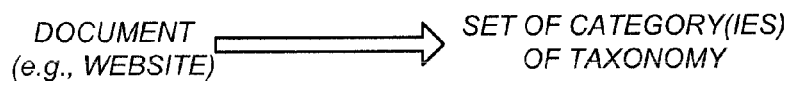
Figure 11:
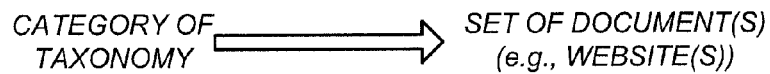
Figure 12:
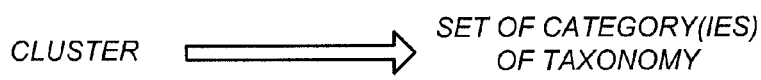
Figure 13:
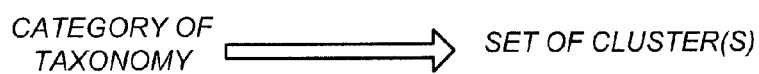
Figure 14:
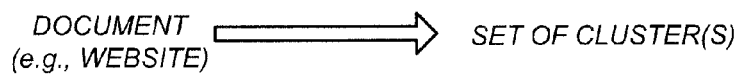
Figure 15:
Figure 16:
Figure 17:

FIGS. 8-17 illustrate various exemplary mappings, one or more of which may be stored as indexes in various embodiments consistent with the present invention. FIG. 8 illustrates a mapping from a word (e.g., an alpha-numeric string, a phonemic string, a term, a phrase, etc.) to a set of one or more clusters (e.g., PHIL cluster(s)). FIG. 9 illustrates a mapping from a cluster to one or more words. FIG. 10 illustrates a mapping from a document (e.g., a Webpage (or a portion thereof), a Website (or a portion thereof), anchor text, ad creative text, etc.) to a set of one or more categories of a taxonomy. (Recall, e.g., 330 and 332 of FIGS. 3, and 430 and 432 of FIG. 4.) FIG. 11 illustrates a mapping from a category of a taxonomy to a set of one or more documents. FIG. 12 illustrates a mapping from a cluster to a set of one or more categories of a taxonomy. (Recall, e.g., 230 and 232 of FIGS. 2, and 230' of FIG. 4.) FIG. 13 illustrates a mapping from a category of a taxonomy to one or more clusters. FIG. 14 illustrates a mapping from a document to a set of one or more clusters. FIG. 15 illustrates a mapping from a cluster to a set of one or more documents. FIG. 16 illustrates a mapping from a word (e.g., an alpha-numeric string, a phonemic string, a term, a phrase, etc.) to a set of one or more categories of a taxonomy. FIG. 17 illustrates a mapping from a category of a taxonomy to a set of one or more words.

§4.2.3.2 Using Cluster Attributes to Assign Categories to Certain Clusters

In at least one embodiment consistent with the present invention, one or more clusters may be manually mapped to one or more categories of a taxonomy, effectively overriding (or supplementing) an automatic category determination for such cluster(s). For example, in such an embodiment, clusters with the PORN attribute may be assigned to an "/Adult/Porn" category, even if the automatically determined category is different. Similarly, clusters with the NEGATIVE attribute may be assigned to a "/News & Current Events/News Subjects (Sensitive)" category, even if the automatically determined category is different. Similarly, clusters with the LOCATION attribute may be assigned to a "/Local Services/City & Regional Guides/LOC (Locations)" category, even if the automatically determined category is different. Such clusters may be manually generated, manually revised, and/or manually reviewed.

§4.2.3.3 Extracting Website-Cluster Mappings and Scores from the Content-Relevant AD Serving Logs Referring back to term-cluster information (index) 115 of FIG. 1, a weighted set of clusters may be generated for Websites (e.g., Websites participating in a content-relevant ad serving network, such as AdSense from Google of Mountain View, Calif.) as follows.

A log record may be generated for each pageview for a Webpage displaying (e.g., AdSense) ads. The set of scored (PHIL) clusters for the Webpage may be recorded with that log record. For a given Webpage, there may be a plurality (e.g., between one and dozens) of clusters, and each cluster has an associated activation score. (See, e.g., the '571 application which describes "activation".) The activation score is a measurement of how conceptually significant the given cluster is to the document being analyzed. Lower valued activation scores indicate a lower conceptual significance and higher valued activation scores indicate a higher conceptual significance.

§4.2.3.4 Determining the Set of Scored Clusters for Each Website

Clusters that do not have an activation score of at least a predetermined value (e.g., 1.0) for the Webpage (as discussed above) can be ignored. (Recall, e.g., operations 122 of FIG. 1.) The predetermined value may be set to a minimum threshold used by the ad serving system in serving ads. Certain special case clusters (e.g., those marked as STOP) may also be ignored.

Of the remaining clusters (referred to as "qualifying clusters"), the sum of activation scores of these clusters may be determined. Each qualifying cluster for the Webpage gets a "score." The cluster score may be defined as the product of (a) the qualifying cluster's activation score on the Webpage and (b) the number of pageviews that the Webpage received.

The following example illustrates how qualified clusters may be scored as just described above. Suppose that a given cluster $c_1$ is activated on two Webpages within a Website. Assume that the cluster has an activation score of 10.0 on Webpage $p_1$ and an activation score of 20.0 on Webpage $p_2$. During the course of a week, Webpage $p_1$ receives 1000 pageviews and Webpage $p_2$ receives 1500 pageviews. The sum of the cluster score and pageview products for a Website for the week is 100,000. The cluster would then receive the following overall score for the website:

SCORE=((10.0 activation/pageview*1000 pageviews)+(20.0 activation/pageview*1500 pageviews))/100,000 activation

=(10,000+30,000)/100,000

=0.4

This effectively weights the total cluster scores for a Website by both pageviews and activation scores on individual Webpages of the Website. The set of cluster scores for a Website will sum to 1. One disadvantage of this approach is that higher traffic for a given Webpage does not necessarily mean that that Webpage is more representative, from a categorization standpoint, than a lower traffic Webpage. Thus, it may be desirable to temper the pageviews parameter and/or give a higher weight to the cluster Webpage activation score. Naturally, activation scores may be weighted as a function of one or more factors which are reasonable in the context in which an embodiment consistent with the present invention is being used.

After a set of scored clusters for a Website is obtained, the number of clusters can be reduced by selecting only the top S (e.g., 25) highest-scoring clusters (all clusters for Websites that have fewer than S clusters). This set may be further reduced by keeping only the highest scoring clusters that make up the top Y % (e.g., 70%) of the identified set in terms of score.

The scores of the remaining clusters may be normalized so that they sum to 1.

§4.2.3.5 Determining the "Best" Categories for Each Website

Referring back to operations 162 of FIG. 1, a reduced set of categories (e.g., primary and secondary categories) may be determined for each Website. The categories 160 serving as an input to this operation may be a pared down set of scored categorizes (associated with PHIL clusters—referred to as "cluster categories" in the following) for a Website (already described above). Typically, in one exemplary embodiment consistent with the present invention, there will be a final set of about ten (10) cluster categories per Website. There is usually an overlap of cluster categories, but it is possible for each cluster to have completely different categories.

In one embodiment consistent with the present invention, the categories are part of a hierarchical taxonomy that includes up to Z (e.g., 5) levels per branch. In such an embodiment, besides deciding among different "branches" of the taxonomy, the best level along a branch is also determined. For example, it might be clear that the category should be somewhere in the "/Automotive" branch, but the question is which of "/Automotive", "/Automotive/Auto Parts", "/Automotive/Auto Parts/Vehicle Tires", or "/Automotive/Vehicle Maintenance" is the best one. The score for each input cluster contributes to the significance of its corresponding primary and secondary cluster categories to the overall categorization of the website.

Regardless of how many cluster categories are competing with each other for a Website categorization, it is possible that none of them has enough conceptual significance (e.g., as measured by the sum of scores for that category) to merit being chosen. In other words, the possible categories could be too diluted among the Website for any single one to "win". In at least some embodiments consistent with the present invention, this minimum conceptual significance may be enforced as a requirement by setting a threshold value (e.g., stored as a floating point decimal). Assuming that the cluster scores for a given Website are normalized to sum to 1, in at least some embodiments, a minimum conceptual significance threshold value of 0.24, or about 0.24, may generate good results. This means that if the best candidate for the primary or secondary category has a summed score of less than 0.24, a category of "NONE" will be assigned. Note that this threshold value can be adjusted based on the method used to score clusters on a Website.

In at least some embodiments, it may be desirable to omit the secondary cluster categories to categorize Websites instead of using both the primary and secondary cluster categories to categorize Websites.

The following terminology is used in a description of the exemplary embodiment below. Given a hierarchical category path of the form /level-1/level-2/ . . . /level-m, where m is the number of the deepest level in the path, "subsume-level-n" refers to the subsumption of the path up to level-n if n<m, and no subsumption of the path if n>=m. For example, for a case where n<m, the subsume-level-2 of the category path "/Automotive/Auto Parts/Vehicle Tires" is "/Automotive/Auto Parts/". As another example, for a case where n>=m, the subsume-level-4 of "/Automotive/Auto Parts/Vehicle Tires" is just "/Automotive/Auto Parts/Vehicle Tires" itself with no modification.

Note that the level-n category will include its own intra-category cluster score(s), as well as those of any subsumed, deeper layer, categories. The sum of these cluster scores is referred to as the "self&subsumed category cluster score" (or "S&S category cluster score") for the level-n category.

Regardless of how many categories are competing with each other for a document (e.g., Website) categorization, it is possible that none of them has enough conceptual significance, measured by the S&S category cluster score, to merit being chosen. In other words, the clusters for a Website could be too diluted among the possible categories for any one category to be considered as the clearly the best category for the Website.

In at least some embodiments consistent with the present invention, a minimum conceptual significance requirement may be imposed through the setting of a threshold value. Naturally, it's easier to get categories that pass the threshold at higher subsume-levels because they correspond to more general categories. In at least some embodiments consistent with the present invention, the threshold value is chosen to maximize the overall quality across the various subsume-levels, but biased slightly toward the lower subsume-levels since categorization subsume-level scores will necessarily be lower at lower levels than at higher levels, even though such categories might be the most appropriate.

In one exemplary embodiment consistent with the present invention, a minimum conceptual significance threshold value of about 0.24 worked well, assuming that the cluster scores for a given website sum to 1 (as detailed above) and a five layer category taxonomy with on the order of 500 nodes is used. It is believed that a minimum conceptual significance threshold value from 0.20 to 0.30 should work well. This means that if the best candidate for the primary or secondary category at a given subsume-level has a summed score of less than the threshold, a category of "NONE" will be assigned. Note that determining an appropriate threshold value may depend on the method that was used to score clusters on the document being categorized.

Having introduced some terminology, an exemplary method for determining the "best" categorizes for a document, in a manner consistent with the present invention, is now described. Let t be the minimum conceptual significance threshold value. Let d be the deepest level in the taxonomy. The "best" primary category may be determined as follows. The best subsume-level-1 and its corresponding S&S category cluster score are determined. This is repeated for all levels up to level d. The greatest (deepest) value of p whose best subsume-level-p category has S&S category cluster score ≥t is chosen. Alternatively, S&S category cluster scores could be analyzed from the deepest category level to the top (most general) category level. In this way, the method could stop after processing a level in which an S&S category score is ≥t. Let v (the best primary category) be the best subsume-level-p category, or "NONE" if no category satisfies the threshold.

The "best" secondary category may be defined as follows. If v, the best primary category, is "NONE", the best secondary category will be "NONE". If v is not "NONE", the best subsume-level-1 and its corresponding subsume-level-1-score, where subsume-level-1 is not equal to v, are determined This is repeated constrained by the restriction of subsume-level-n not being equal to v, for all levels up to level d. The greatest (deepest) value of q whose best subsume-level-q category has an S&S category cluster score >=t is chosen. Let w (the best secondary category) be the best subsume-level-q category, or "NONE" if no category satisfies the threshold.

Figure 18:
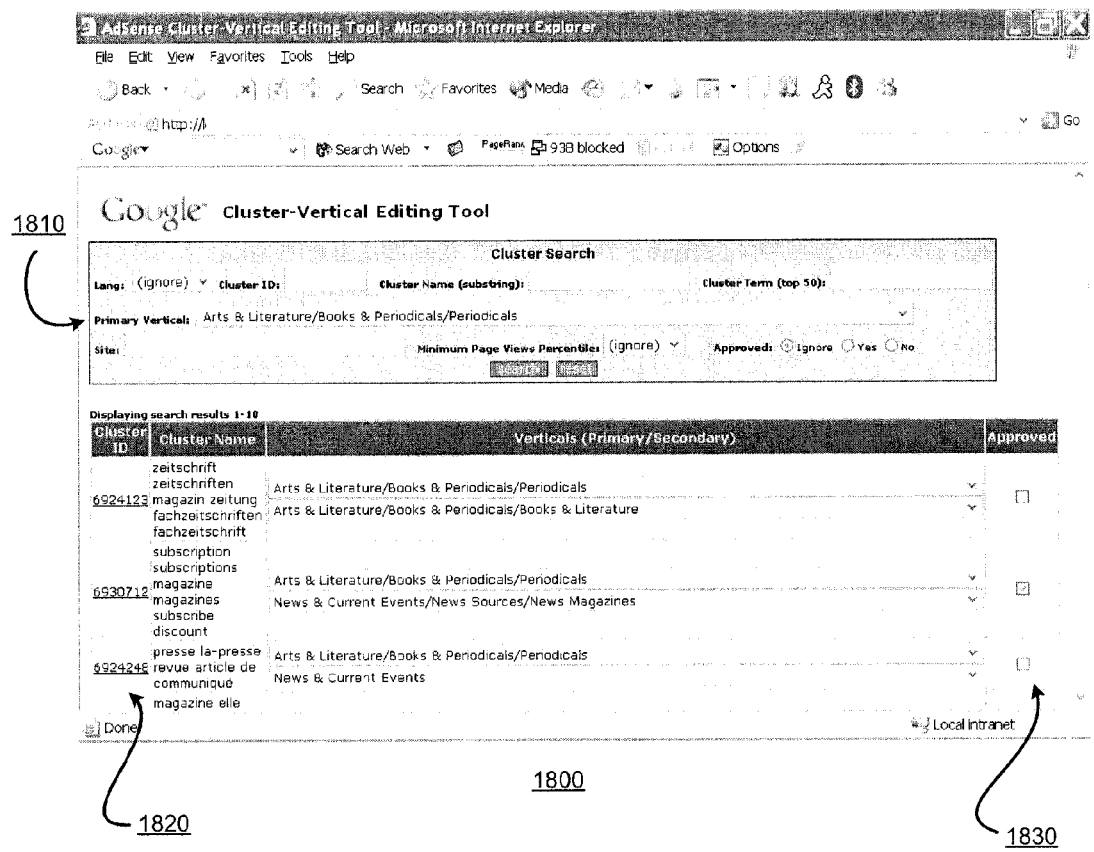

§4.3 Examples of Operations in an Exemplary Embodiment Consistent with the Present Invention FIGS. 18-23 illustrate various display screens of an exemplary user interface consistent with the present invention. FIG. 18 illustrates a screen 1800 in which a user can enter a category of a taxonomy (in this case, a "primary vertical node name") in block 1810. In response, various PHIL clusters 1820 are output. (In this example, the cluster name is simply the six (6) most important or highest scoring terms in the cluster.) This output may be generated, for example, using an index including mappings such as shown in FIG. 13. An association of a vertical node (i.e., a category of a taxonomy) and a cluster may be subject to manual approval as indicated by check boxes 1830.

Figure 19:
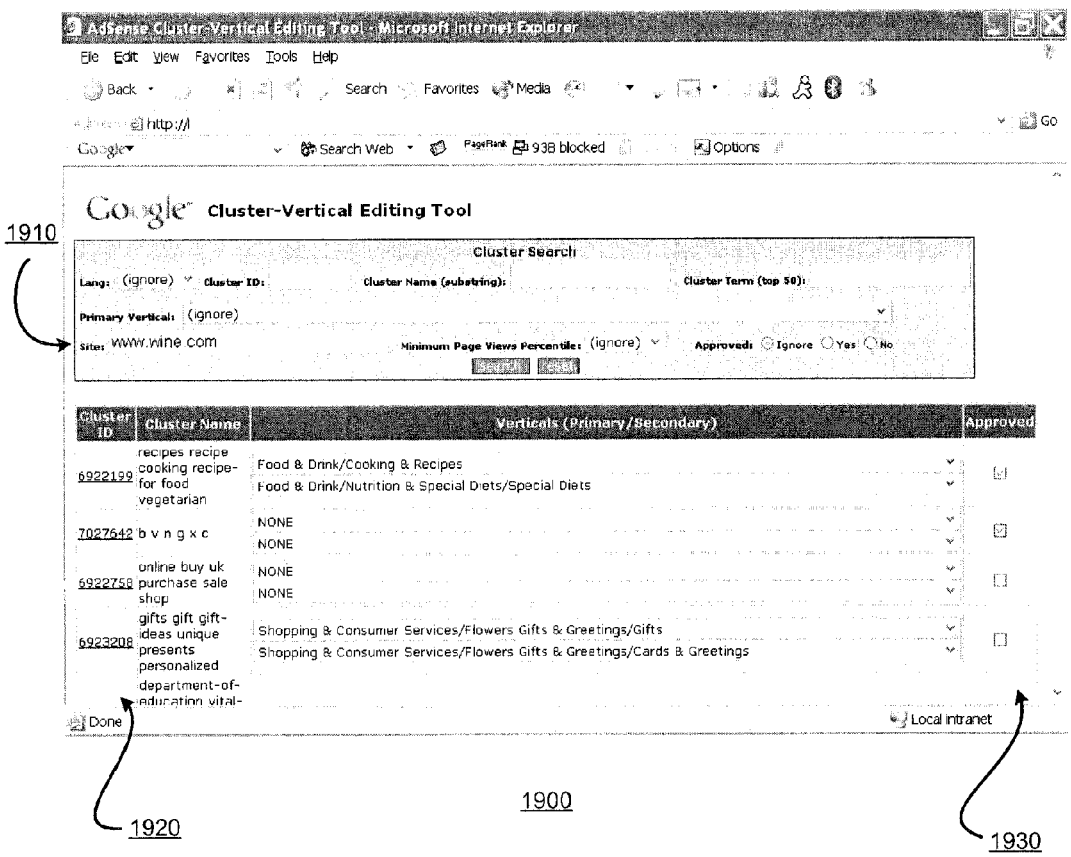

FIG. 19 illustrates a screen 1900 in which a user can enter a Website (homepage) address in block 1910. In response, various PHIL clusters 1920 are output. This output may be generated, for example, using an index including mappings such as shown in FIG. 14. An association a document (e.g., a Website) and a cluster may be subject to manual approval as indicated by check boxes 1930.

Figure 20:
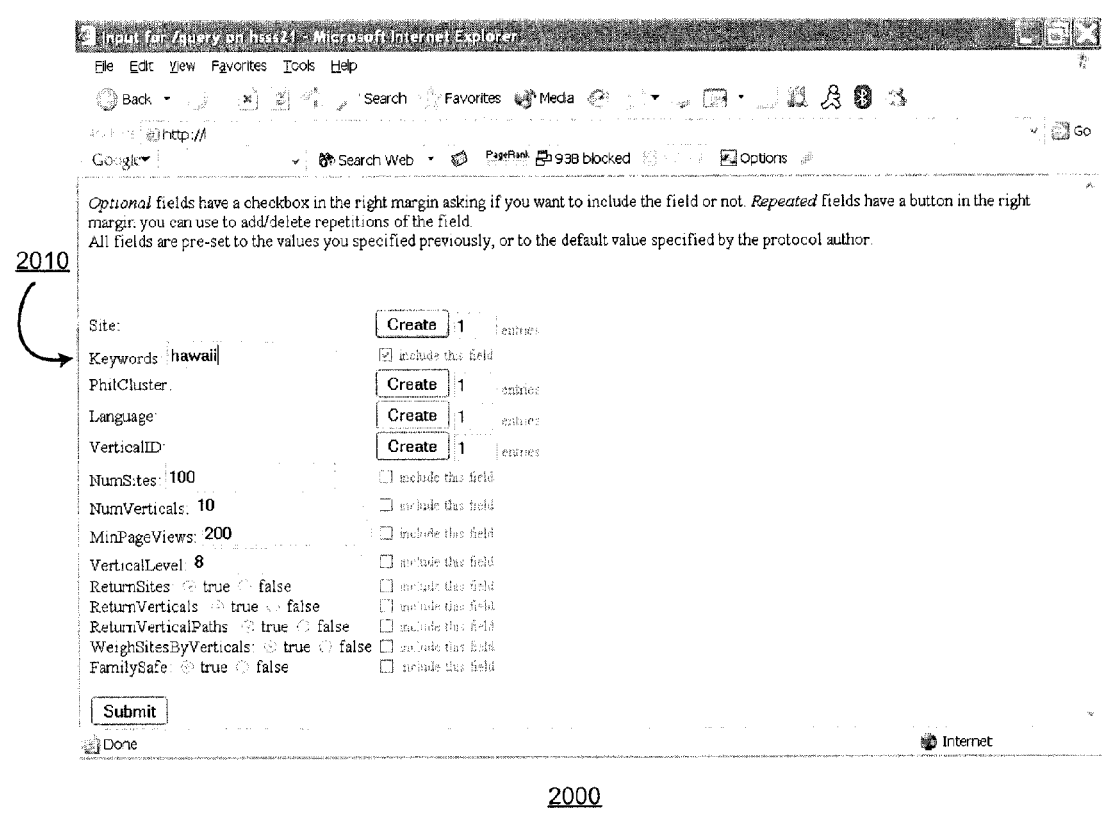
Figure 21:
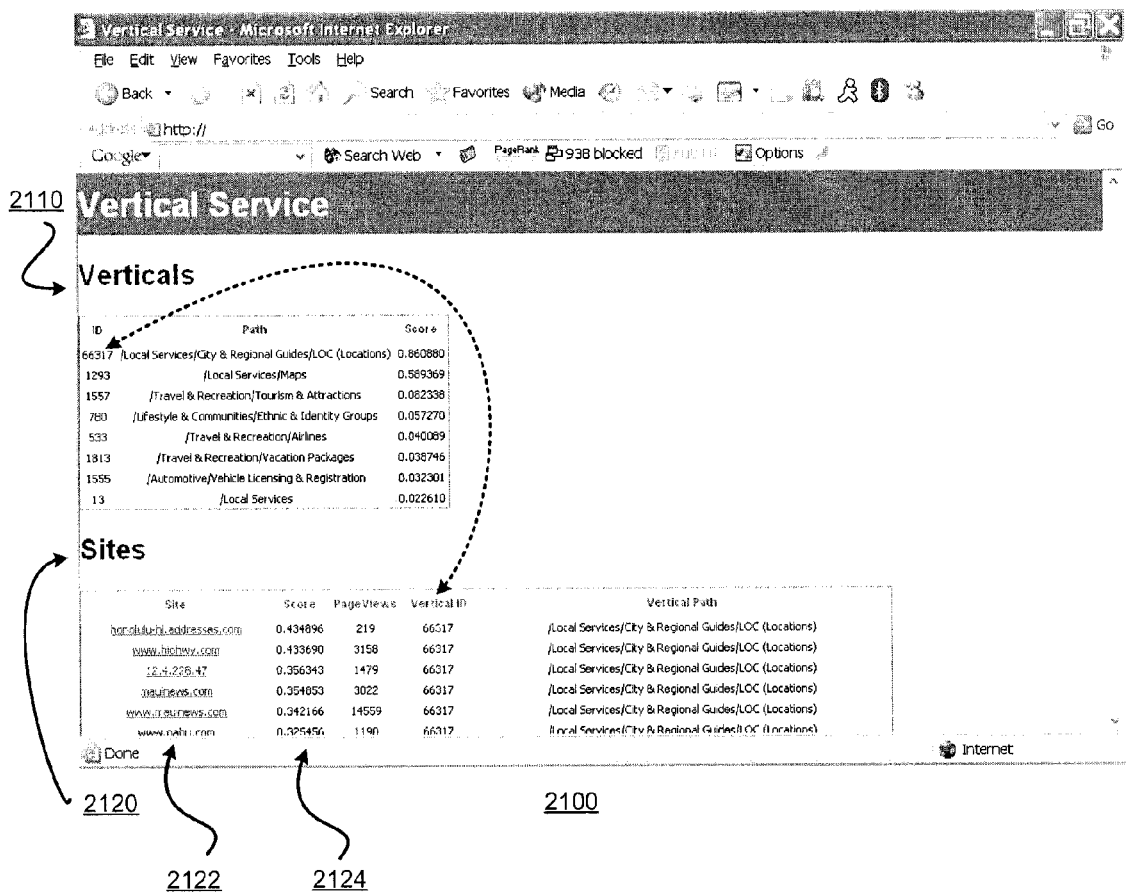

FIG. 20 illustrates a screen 2000 in which a user can enter one or more words in block 2010 (and perhaps other parameters) to obtain related vertical categories and Websites. FIG. 21 illustrates a screen 2100 including the output vertical categories 2110 and Websites 2120. For example, indexes including mappings such as shown in FIGS. 8 and 12 could be used to output a set of categories from an input word. Alternatively, since indexes of words to Websites are common (e.g., in search engines), the word in box 2010 may have been mapped to a set of one or more Websites, some of which may have been used, in conjunction with an index including a mapping such as shown in FIG. 10, to obtain categories of a taxonomy. As shown, the Website information 2120 may include Website names 2122 and scores 2124.

Figure 22:
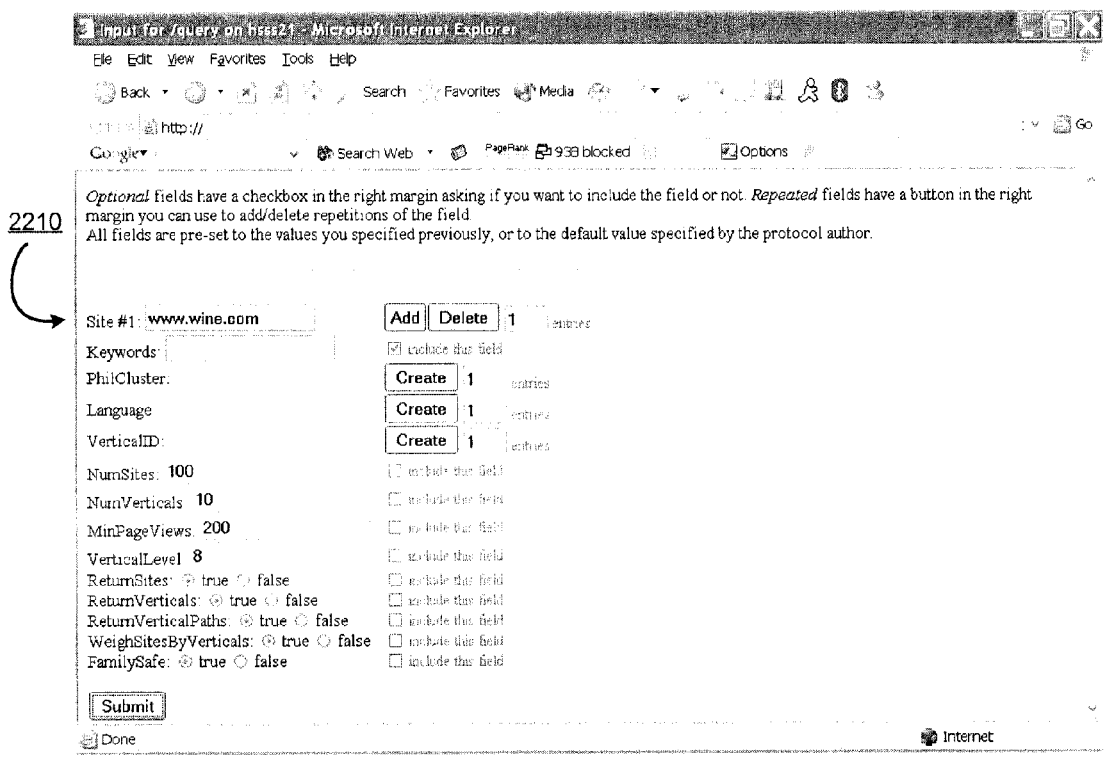
Figure 23:
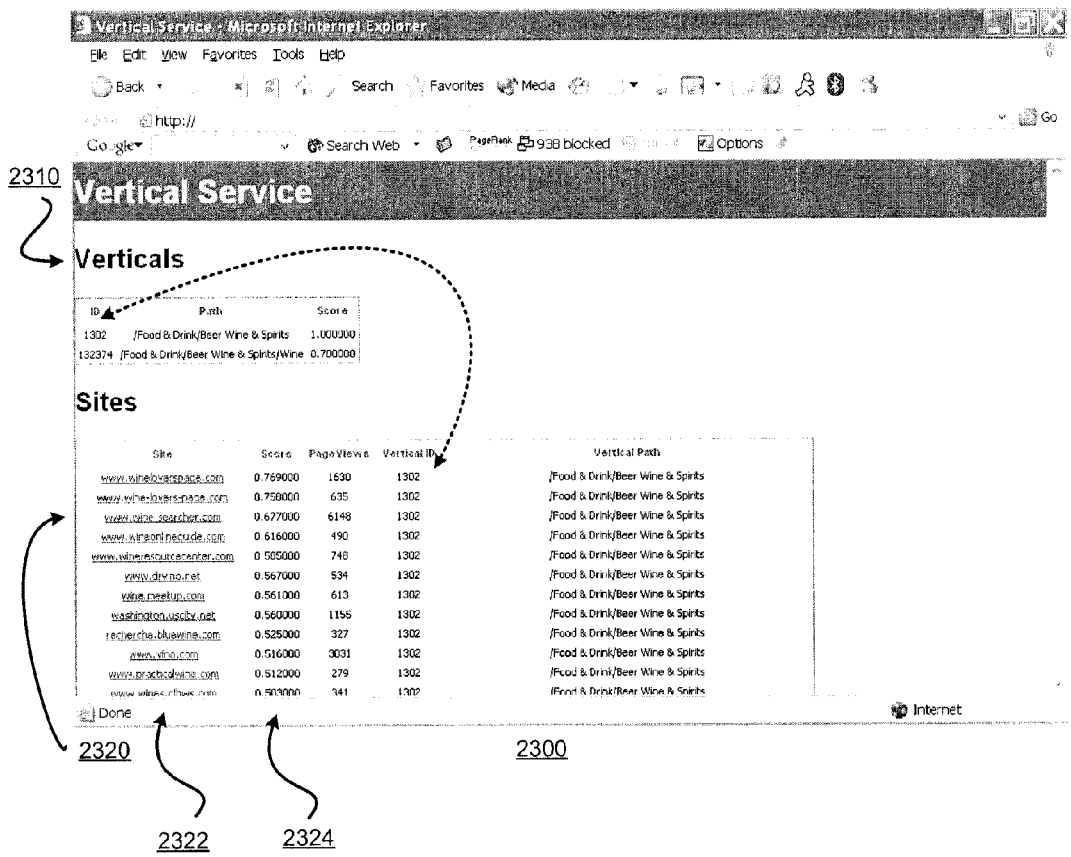

FIG. 22 illustrates a screen 2200 (like the screen 1800 of FIG. 18) in which a user can enter one or more Websites in block 2210 (and perhaps other parameters) to obtain related vertical categories and Websites. FIG. 23 illustrates a screen 2300 including the output vertical categories 2310 and Websites 2320. For example, an index including mappings such as shown in FIG. 10 could be used to output a set of categories from an input Website. Further, an index including mappings such as shown in FIG. 11 could be used to generate further Website(s) from the determined category(ies). As shown, the Website information 2320 may include Website names 2322 and scores 2324.

As the foregoing examples illustrate, various indexes can be used, or used in combination (perhaps in different sequences) to obtain related objects of a second type from input objects of a first type. Objects of various types may be associated with categories (e.g., nodes) of a taxonomy.

Figure 24:
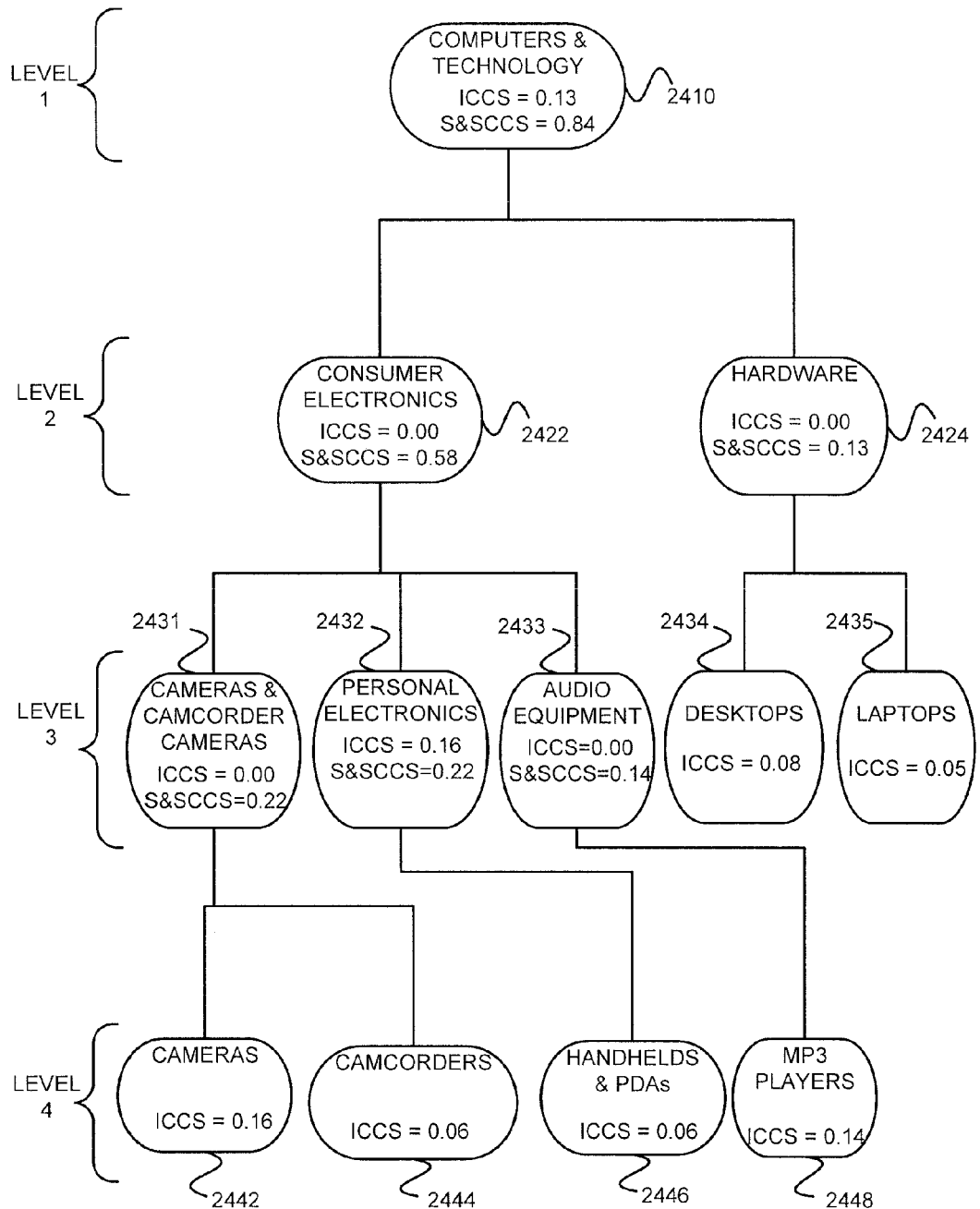
FIG. 24 is a portion of a taxonomy used to illustrate how a "best" category can be determined using an exemplary embodiment consistent with the present invention.

An example illustrating the exemplary technique, such as described in §4.2.3.5 above, for selecting a primary and secondary category for a Website is now described with reference to FIG. 24. Consider a hypothetical Website about electronic gadgets. Assume that a threshold of 0.24 is used. Assume further that the clusters and corresponding primary categories and cluster-category scores for the Website are:

| Cluster ID | Primary Category | Cluster score |
|---|---|---|
| 6937542 | /Computers & Technology (2410) | 0.13 |
| 6922978 | /Computers & Technology/Consumer Electronics/Audio Equipment/MP3 Players (2448) | 0.14 |
| 6976937 | /Computers & Technology/Consumer Electronics/Cameras & Camcorders/Cameras (2442) | 0.07 |
| 6922928 | /Computers & Technology/Consumer Electronics/Cameras & Camcorders/Camcorders (2444) | 0.06 |
| 6922526 | /Computers & Technology/Consumer Electronics/Cameras & Camcorders/Cameras (2442) | 0.09 |
| 6946862 | /Computers & Technology/Consumer Electronics/Personal Electronics (2432) | 0.16 |
| 6923006 | /Computers & Technology/Consumer Electronics/Personal Electronics/Handhelds & PDAs (2446) | 0.06 |
| 6922985 | /Computers & Technology/Hardware/Desktops (2434) | 0.08 |
| 6922448 | /Computers & Technology/Hardware/Laptops (2435) | 0.05 |
| 6936814 | /News & Current Events/News Sources (not shown) | 0.16 |

Intermediate results involved in the derivation of the Primary Category are:

| | |
|---|---|
| Subsume-Level 1 Category: | /Computers & Technology |
| S&S Category Cluster Score: | 0.84 |
| Subsume-Level 2 Category: | /Computers & Technology/Consumer Electronics |
| S&S Category Cluster Score: | 0.58 |
| Subsume-Level 3 Category: | /Computers & Technology/Consumer Electronics/Cameras & Camcorders |
| S&S Category Cluster Score: | 0.22 |
| Subsume-Level 4 Category: | /News & Current Events/News Sources |
| S&S Category Cluster Score: | 0.16 |
| Subsume-Level 5 Category: | /News & Current Events/News Sources |
| S&S Category Cluster Score: | 0.16 |

Note that in the layer 4 and 5 categories, n > m. In the foregoing example, the winning Primary Category is "/Computers & Technology/Consumer Electronics" since it was the deepest (most specific) level having a S&S category cluster score exceeding the threshold of 0.24.

§4.4 Conclusions

As can be appreciated from the foregoing, some embodiments consistent with the present invention may be used to associate different types of objects with categories (nodes) of a taxonomy. Once these associations are made, some embodiments consistent with the present invention may be used to find "related" objects, perhaps of different types, using the associations between objects and categories of a taxonomy. For example, embodiments consistent with the present invention may be used to permit Websites to be categorized into a hierarchical taxonomy of standardized industry vertical categories. Such a hierarchical taxonomy has many potential uses. Further, if different types of objects (e.g., advertisements, queries, Webpages, Websites, etc.) can be categorized, relationships (e.g., similarities) between these different types of objects can be determined and used (e.g., in determining advertisements relevant to a Webpage or Website for example, or vice-versa).

After categorizing clusters and Websites into this taxonomy, other dimensions (e.g., language, country, etc.) may be added (e.g., in the manner of online analytical processing (OLAP) databases and data warehousing star schemas). The category dimension may be defined by hierarchical levels, but some of the other dimensions, like language, could be flat. After deriving these various dimensions, metrics (e.g., pageviews, ad impressions, ad clicks, cost, etc.) may be aggregated into them.

What is claimed is:

1. A computer-implemented method to associate a semantic cluster with one or more categories of a predefined taxonomy, the method comprising:
 a) accepting, by a computer system including at least one computer, a plurality of semantic clusters of re-occurring terms within a document, and having a frequency based on the reoccurrence of the term;
 b) identifying, by the computer system based on the accepted clusters of re-occurring terms within the document, one or more concepts for the document, each concept identifying different re-occurring terms having identical meanings;
 c) scoring, by the computer system, the identified one or more concepts, the score of each of the one or more concepts weighted by cluster frequency of each of the re-occurring terms identified by said concept;
 d) identifying, by the computer system, a set of one or more categories using at least some of the one or more scored concepts to look up one or more categories in a concept-category index, wherein a category corresponds to a node of the predefined taxonomy, which defines a structured set of categories; and
 e) associating, by the computer system, at least some of the one or more categories with the semantic cluster.

2. The computer-implemented method of claim 1 wherein the semantic cluster is a term co-occurrence cluster in which terms that tend to co-occur in at least one of (A) search sessions on search engine, or (B) documents available on the World Wide Web, are grouped together under a semantic cluster.

3. The computer-implemented method of claim 1 wherein the semantic cluster includes terms that tend to co-occur in a search session on a search engine.

4. The computer-implemented method of claim 1 wherein the semantic cluster includes terms that tend to co-occur in documents available on the World Wide Web.

5. The computer-implemented method of claim 1 wherein the act of associating at least some of the one or more categories with the semantic cluster includes generating and storing an index entry which maps the semantic cluster to each of the at least some of the one or more categories.

6. The computer-implemented method of claim 1 wherein categories of the predefined taxonomy correspond to at least one of (A) related products that are likely to be found in Website content, (B) related services that are likely to be found in Website content, (C) related industries that are likely to be found in Website content, and (D) related topics that are likely to be found in Website content.

7. A computer-implemented method to associate a property with one or more categories of a predefined taxonomy, the method comprising:
 a) accepting, by a computer system including at least one computer, information about the property;
 b) identifying, by the computer system, a set of one or more scored semantic clusters using the accepted property information, wherein each of the one or more scored semantic clusters comprise a re-occurring term within (A) a search session on a search engine, or (B) a document available on the World Wide Web, at a frequency based on the reoccurrence;
 c) identifying, by the computer system based on the identified scored semantic clusters of re-occurring terms within the search session or document, one or more concepts for the property, each concept identifying different re-occurring terms having identical meanings;
 d) scoring, by the computer system, the identified one or more concepts, the score of each of the one or more concepts weighted by cluster frequency of each of the re-occurring terms identified by said concept;
 e) identifying, by the computer system, a set of one or more categories according to the scores of the one or more concepts; and
 f) associating, by the computer system, at least some of the one or more categories with the property.

8. The computer-implemented method of claim 7 wherein the property is a Webpage.

9. The computer-implemented method of claim 7 wherein the property is a Website including a plurality of Webpages.

10. The computer-implemented method of claim 7 wherein the act of associating at least some of the one or more categories with the property includes generating and storing an index entry which maps property information to each of the at least some of the one or more categories.

11. The computer-implemented method of claim 7 wherein categories of the predefined taxonomy correspond to at least one of (A) related products that are likely to be found in Website content, (B) related services that are likely to be found in Website content, (C) related industries that are likely to be found in Website content, (D) related topics that are likely to be found in Website content, and (E) related content formats that are likely to be found in Website content.

12. The method of claim 1, wherein identifying a set of one or more categories using at least some of the one or more scored concepts to look up one or more categories in a concept-category index further comprises determining a score for each of the set of one or more categories based on a sum of values including (1) an intra-category cluster score of the category, and (2) intra-category cluster scores of categories that are descendants of the category in the hierarchical taxonomy.

13. The method of claim 1, wherein identifying a set of one or more scored concepts using the accepted cluster to look up one or more concepts in a cluster-concept index further comprises comparing a score of each of the one or more scored concepts to a threshold and identifying the set of one or more scored concepts with scores above the threshold.

* * * * *